(12) United States Patent
Srivastava et al.

(10) Patent No.: US 6,384,534 B1
(45) Date of Patent: May 7, 2002

(54) ELECTRODE MATERIAL FOR FLUORESCENT LAMPS

(75) Inventors: Alok Mani Srivastava, Niskayuna; Holly Ann Comanzo, Schenectady, both of NY (US); Laurence Bigio, University Heights, OH (US); William Winder Beers, Chesterland, OH (US); Thomas Frederick Soules, Richmond Heights, OH (US); Emoke Abasari, Budapest (HU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/466,009

(22) Filed: Dec. 17, 1999

(51) Int. Cl.[7] .................................... H01J 61/04
(52) U.S. Cl. .................... 313/633; 252/500
(58) Field of Search ................ 313/491, 633; 252/500, 518.1, 519.1

(56) References Cited

U.S. PATENT DOCUMENTS

| | | | |
|---|---|---|---|
| 3,563,797 A | 2/1971 | Young et al. | 117/223 |
| 3,798,492 A | 3/1974 | Menelly | 313/346 R |
| 3,906,271 A | 9/1975 | Aptt, Jr. | 313/491 |
| 3,951,874 A | 4/1976 | Kern | 252/521 |
| 3,953,376 A | 4/1976 | Kern | 252/521 |
| 3,969,279 A | 7/1976 | Kern | 252/521 |
| 3,970,888 A | 7/1976 | Trattner | 313/346 R |
| 4,031,426 A | 6/1977 | Kern | 313/346 R |
| 4,275,330 A | 6/1981 | Cho et al. | 313/630 |
| 5,278,474 A | 1/1994 | Nieda | 313/631 |
| 5,614,784 A | 3/1997 | Harzig et al. | 313/491 |
| 5,654,606 A | 8/1997 | Weijtens et al. | 313/491 |
| 5,672,936 A | 9/1997 | Hatsutori et al. | 313/491 |

FOREIGN PATENT DOCUMENTS

CA    1150340    7/1983

OTHER PUBLICATIONS

T. F. Soules et al, *Thermal Model of the Fluorescent Lamp Electrode*, J. Illum. Eng. Soc., 81–92 (1989).

B. V. Bondarenko et al., *Thermoelectron Properties of Tantalates of Alkaline Earth Metals*, 5 Radiotekhnika I Elektronika, 1553–1555, (1960).

L.M. Kouba et al., *The BaO–$Ta_2O_5$ System*, 22 Russian J. Inorg. Chem., 1544–1546, (1977).

*Primary Examiner*—Vip Patel
(74) *Attorney, Agent, or Firm*—Noreen C. Johnson; Christian G. Cabou

(57) ABSTRACT

There is provided an emissive mixture for cathodes of fluorescent lamps comprising a ceramic material having a formula $(A_{1-x} Ca_x)_6 (Ta_{1-y} W_y)_2 O_{11+y}$, where A is barium or a combination of barium and strontium, $0 \leq x < 0.5$, $0 \leq y < 1$, and one of x or y is greater than zero. The ratio of lamp efficacy to number of lamp starts may be improved by optimizing the amount of Ca and W present in the ceramic material.

30 Claims, 6 Drawing Sheets

$(Ba_{(1-x)}Ca_x)_6(Ta_{(1-v)}W_v)_2O_{11.+v}$

ELECTRODE MATERIAL FOR FLUORESCENT LAMPS

This invention was funded by the U.S. Department of Ene Contract No. DE-FC36-97GO10236. The U.S. government may have certain rights in this invention.

FIELD OF THE INVENTION

The present invention is directed generally to an electrode material for fluorescent lamps, and more particularly to an emissive mixture having a formula $(A_{1-x} Ca_x)_6 (Ta_{1-y} W_y)_2 O_{11+y}$, where A is barium or barium and strontium, coated on fluorescent lamp cathodes.

BACKGROUND OF THE INVENTION

The standard emissive coating currently used on a majority of electrodes of commercial fluorescent lamps contains a mixture of barium, calcium, and strontium oxides ("the triple oxide emissive mixture"). Since these oxides are highly sensitive to $CO_2$ and water, they are placed on the lamp electrodes initially as a mixture of barium, calcium and strontium carbonates in a slurry suspension containing a binder and a solvent. The mixture of carbonates is then "activated" during the manufacturing process by resistively heating the electrodes until the carbonates decompose, releasing $CO_2$ and some CO, and leaving behind the triple oxide emission mixture on the lamp electrode. It is believed that barium, in some form, is primarily responsible for the electron emission. It is also known to add a small amount of Al, Hf, Zr, Ta, W and Th dopants to the triple oxide emissive mixture, as discussed in U.S. Pat. No. 3,563,797 to Young.

However, the triple oxide emissive mixture suffers from several disadvantages. First, the "activation" requires an undesirably high temperature to convert the carbonates to oxides. Second, the conversion of carbonates to oxides undesirably releases $CO_2$ and some CO. Third, lamps having electrodes coated with the triple oxide emissive mixture have a rather short operating lifetime.

It has been previously suggested in U.S. Pat. No. 4,031,426 to Kern, incorporated herein by reference in its entirety, to substitute the triple oxide emissive mixture with barium tantalate emissive mixtures having various barium to tantalum ratios. According to U.S. Pat. No. 4,031,426, the barium tantalate emissive mixtures may be "activated" in less time and at a lower temperature than the triple oxide emissive mixture. Furthermore, lamps having electrodes coated with the barium tantalate emissive mixtures have a longer operating lifetime than the lamps with the triple oxide emissive mixture. The preferred barium oxide to tantalum pentoxide ratio in U.S. Pat. No. 4,031,426 is 5:1, resulting in an emissive mixture having the following composition: $Ba_5Ta_2O_{10}$. Emissive mixtures having barium oxide to tantalum pentoxide ratios greater or less than 5:1 were reported in this patent as having a lower electron emission.

However, a fluorescent lamp containing the barium tantalate emissive mixture has a somewhat inferior efficacy compared to the triple oxide emissive mixture. The present invention is directed to overcoming or at least reducing the effects of one or more problems set forth above.

BRIEF SUMMARY OF THE INVENTION

One embodiment of the present invention provides a composition of matter, comprising $(A_{1-x} Ca_x)_6 (Ta_{1-y} W_y)_2 O_{11+y}$, wherein A comprises one of barium or a combination of barium and strontium, $0 \leq x < 0.5$, $0 \leq y < 1$, and at least one of x or y is greater than zero.

Another embodiment of the present invention provides a method of making an emissive mixture comprising a composition of matter having a formula $(A_{1-x} Ca_x)_6 (Ta_{1-y} W_y)_2 O_{11+y}$, the method comprising determining a desired ratio of a mean lamp efficacy to a mean number of lamp starts by determining the amount of Ca and W to be present in the emissive mixture, mixing predetermined amounts of starting materials based on the determination of the desired ratio to form an emissive mixture and coating the emissive mixture on an electrode, wherein A comprises one of barium or a combination of barium and strontium, $0 \leq x < 0.5$, $0 \leq y < 1$ and at least one of x or y is greater than zero

DETAILED DESCRIPTION OF THE INVENTION

Figure 1:
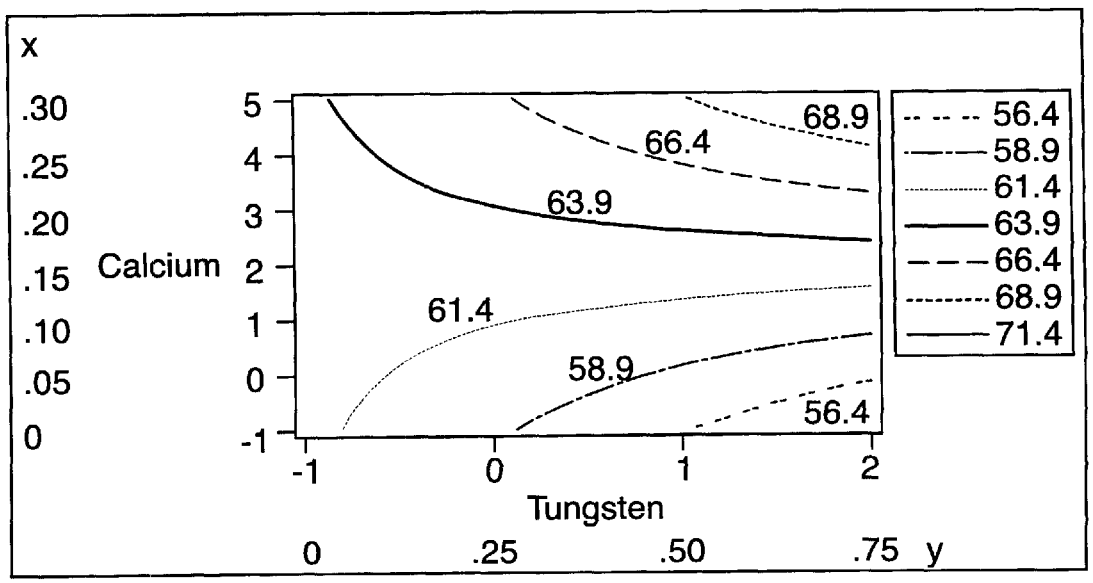
FIG. 1 is a contour plot of predicted efficacy values for different amounts of calcium and tungsten.

The present inventors have discovered that the efficacy (i.e., lumens per watt) and the operating lifetime of a fluorescent lamp may be unexpectedly improved by adjusting the amount of calcium and tungsten added to a barium tantalate emissive mixture having the formula $(A_{1-x} Ca_x)_6 (Ta_{1-y} W_y)_2 O_{11+y}$, where A comprises one of barium or a combination of barium and strontium, $0 \leq x < 0.5$; and $0 \leq y < 1$ and at least one of x or y is greater than zero. Tantalum has a +5 oxidation state, while tungsten has a +6 oxidation state. Therefore, the number of moles of oxygen will depend on the number of moles of tungsten in the emissive mixture, and will vary between 11 and 12. Thus, the emissive mixture is a solid solution of $(A_{1-x} Ca_x)_6 Ta_2 O_{11}$ and $(A_{1-x} Ca_x)_6 W_2 O_{12}$ when the emissive mixture contains tungsten. The present inventors noted that the properties of the above emissive mixture having a 6:1 barium oxide to tantalum pentoxide molar ratio (i.e., a Ba/Ta ratio of 3) that contains calcium and/or tungsten has improved properties compared to a similar emissive mixture that lacks calcium and/or tungsten, as well as compared to emissive mixtures having other barium oxide to tantalum pentoxide molar ratios (such as 5:2 or 4:1 or Ba/Ta ratios of 1.25 or 2, respectively).

In a first preferred embodiment of the present invention, the calcium amount, x, of the emissive mixture is greater than zero and less than 0.3, preferably $0.05 \leq x \leq 0.1$. The tungsten amount in this embodiment may be zero or greater than zero. In a second preferred embodiment of the present invention, the tungsten amount is greater than zero and less than 0.75, preferably $0.25 \leq x \leq 0.5$. The calcium amount in this embodiment may be zero or greater than zero. In a third preferred embodiment of the present invention, the emissive mixture contains non-zero amounts of calcium and tungsten.

In a fourth preferred embodiment of the present invention, the emissive mixture contains $0.25 \leq x \leq 0.3$ and $0.5 \leq y \leq 0.75$, which is predicted to provide a high efficacy for the fluorescent lamp. In a fifth preferred embodiment of the present invention, the emissive mixture contains $0 \leq x \leq 0.05$ and $0.5 \leq y \leq 0.75$, which is predicted to provide a long operating lifetime (greater number of starts before failure) for a fluorescent lamp. In a sixth preferred embodiment of the present invention, the emissive mixture contains $0.05 \leq x \leq 0.1$ and $0 \leq y \leq 0.5$, which is predicted to provide an optimum ratio of operating lifetime to efficacy for the fluorescent lamp.

The present inventors have determined that adding more tungsten to the emissive mixture improves the operating lifetime of the lamp (i.e., increases the number of starts until failure). In contrast, adding more calcium reduces the operating lifetime of the lamp. However, adding more calcium improves lamp efficacy, while adding more tungsten decreases lamp efficacy.

The present inventors have also discovered an unexpected interaction between the amount of tungsten and the amount of calcium in the emissive mix: adding calcium results in a much larger efficacy improvement when there is some tungsten, as opposed to when there is no tungsten, as will be discussed in more detail below. Therefore, the amounts of calcium and tungsten may be optimized to achieve an optimum desired lamp operating lifetime and efficacy.

The present inventors have carried out a multiple regression analysis based on the results of the specific examples described below. The analysis yields a transfer function (formula I) for mean lamp efficacy (specifically, for a 15 watt lamp operated on a control reference ballast with a 6 ohm electrode ("wire" lamp)): efficacy=60.4−1.79*(y)+0.15*(x)+0.89*(y)*(x) (I) where "y" is the ratio of the number of moles or atoms of W to the number of moles or atoms of W and Ta (the "atomic ratio" of tungsten, W/(W+Ta)) and "x" is the "atomic ratio" of calcium (i.e., x=Ca/(A+Ca)) in the emissive mixture. The standard deviation (i.e., the variation in lamp efficacies) may be expressed as S=1.4−0.54*(x). Similar transfer functions may be calculated for different lamps.

FIG. 1 illustrates a contour plot showing the predicted efficacy as a function of the levels of the two parameters, calcium and tungsten, extrapolated from formula I. The X-axis represents the atomic ratio of tungsten in the emissive mixture, while the Y-axis represents the atomic ratio of calcium in the emissive mixture. The lines inside the plot represent values of efficacy in lumens per watt for a given ratio of tungsten to calcium. Increasing the calcium level would be expected to reduce the standard deviation, S. Furthermore, as may be seen from FIG. 1, the efficacy at calcium atomic ratios above 0.2 is higher than that of a triple oxide emissive mixture and of the barium tantalate emissive mixture containing no calcium.

Increasing the calcium amount further while maintaining some tungsten is predicted to yield improved efficacy compared to simply increasing the calcium level without tungsten, as shown in FIG. 1. Furthermore, the predicted increase in efficacy (based on the extrapolation of the derived transfer function) is especially pronounced for emissive mixtures containing an atomic ratio of calcium greater than 0.15, such as an atomic ratio between 0.25 and 0.3, and an atomic ratio of tungsten greater than 0.25, such as an atomic ratio between 0.5 and 0.75. Thus, FIG. 1 illustrates an unexpected, synergistic effect of tungsten and calcium on lamp efficacy.

The present inventors have also carried out a further multiple regression analysis based on the results from the specific examples described below. This further analysis yields a transfer function (formula II) for the mean number of starts until failure (a measure of the operating lifetime of the lamp) for a 15 watt lamp operated on a control reference ballast with a 6 ohm electrode ("wire" lamp) in a rapid cycle (30 seconds on/4.5 minutes off) mode:

$$\text{number of starts}=17{,}074+4591*(y)-2290*(x)-2049*(y)*(x) \quad \text{(II)}$$

where y is the atomic ratio of tungsten and x is the atomic ratio of calcium in the emissive mixture.

Figure 2:
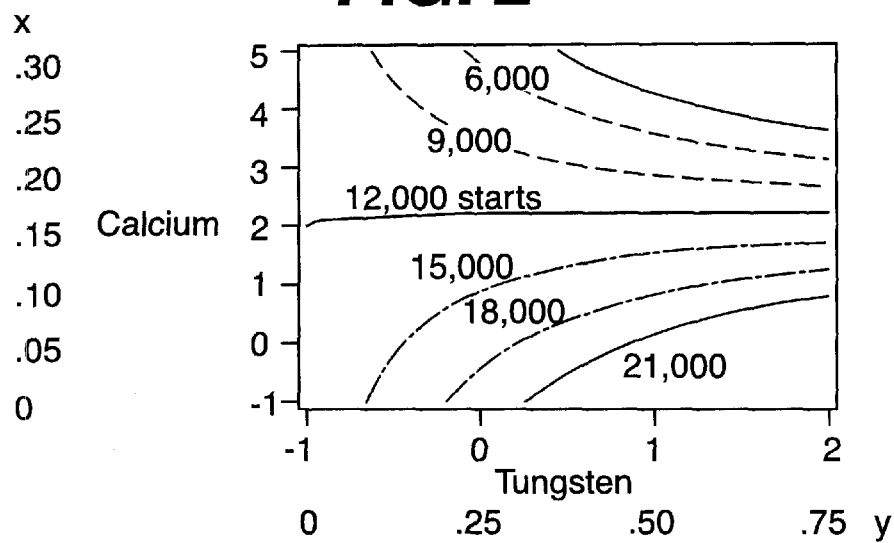
FIG. 2 is a contour plot of predicted number of starts until failure for different amounts of calcium and tungsten.

FIG. 2 illustrates a contour plot showing the predicted number of starts until failure as a function of the levels of the two parameters, calcium and tungsten, extrapolated from formula II. The X-axis represents the atomic ratio of tungsten in the emissive mixture, while the Y-axis represents the atomic ratio of calcium in the emissive mixture. The lines inside the plot represent the number of starts until failure for a given ratio of tungsten to calcium. As illustrated in FIG. 2, decreasing the calcium amount while maintaining some tungsten is predicted to yield an improved number of starts compared to simply decreasing the calcium amount without any tungsten being present. Furthermore, the increase in number of starts is predicted to be especially pronounced for emissive mixtures containing an atomic ratio of calcium less than 0.10, such as an atomic ratio between 0 and 0.05, and an atomic ratio of tungsten greater than 0.25, such as an atomic ratio between 0.5 and 0.75.

As illustrated in FIGS. 1 and 2, there is a trade off between efficacy and number of starts. However, by optimizing the amount of calcium and tungsten, a desired lamp efficacy and operating lifetime may be obtained. For example, selecting the calcium and tungsten atomic ratios in the ranges of $0.05 \leq x \leq 0.1$ and $0 \leq y \leq 0.5$, respectively, provides an emissive mixture which achieves a relatively high lamp efficacy as well as a relatively long lamp operating lifetime. However, other ranges may be selected depending on which of a higher efficacy or a longer operating lifetime is more desirable for a particular application.

The present inventors have also noted that the addition of calcium to the emissive mixture has a beneficial effect of reducing or eliminating dark or "greenish" oxide bands that have sometimes been found to develop early in lamp life about 1.5 cm from the electrodes on the surface of the lamp envelope or cover. These oxide bands have been found to consist of Hg, O, and C, in roughly equal proportions, and represent an undesirable level of end darkening in a lamp.

No oxide bands were observed at 100 hours in lamps containing an emissive mixture with a calcium atomic ratio of $x \geq 0.1$. A calcium atomic ratio of $x=0.33$ is predicted to have the greatest effect on reducing or eliminating the oxide bands.

The present inventors also noted that the addition of zirconium to the emissive mixture also has the effect of reducing or eliminating the formation of the oxide bands. In a preferred aspect of the present invention, the emissive mixture also contains about 2–3 weight percent, preferably 2.3 weight percent of zirconium. However, the zirconium may be omitted, if desired. It should also be understood that the barium tantalate emissive mixture containing Sr, Ca and/or W according to the preferred embodiments of the present invention may contain unavoidable background impurities and intentional additives other than zirconium, if desired.

An emissive mixture with an optimum desired ratio of mean lamp efficacy to mean number of lamp starts may be produced by the following method. First, the desired ratio of a mean lamp efficacy to a mean number of lamp starts is determined or calculated based on the amount of Ca and W to be present in the emissive mixture. Then predetermined amounts of starting materials, such as barium carbonate, tantalum pentoxide, calcium carbonate and/or tungsten trioxide, are mixed together based on the determination or calculation step to form the emissive mixture. The emissive mixture is then coated on a lamp electrode.

The step of determining the desired ratio of a mean lamp efficacy to a mean number of lamp starts may comprise a variety of different determining methods. For example, the step of determining may comprise reviewing the Figures of the present invention to determine the amount of Ca and W that corresponds to the desired ratio. Alternatively, the step of determining may comprise calculating the desired ratio and the Ca and/or W content from formulas I and II or from other formulas or plots derived from calculations or experiments. The step of determining may also comprise carrying out experiments to determine the relationship between the desired ratio and the Ca and/or W content of the emissive mixture.

Furthermore, the step of determining may be carried out only once, followed by carrying out a plurality steps of mixing predetermined amounts of starting materials. In other words, the desired ratio may be calculated only once, followed by the manufacture of plural lamps containing the emissive mixture based on the single determining step.

The emissive mixture of the present invention may be made by various ceramic processing methods. In a preferred embodiment of the present invention, the starting barium, tantalum, calcium and/or tungsten powders, such as a $BaCO_3$ powder, a $Ta_2O_5$ powder and at least one of a $CaCO_3$ powder and a $WO_3$ powder are mixed in a stoichiometric proportion to obtain a first powder that would lead to an emissive mixture having the desired ratio of efficacy to operating lifetime. Preferably, the tantalum pentoxide powder is milled prior to the mixing step such that its median particle size is 4 microns or less to enhance its reactivity.

The first (i.e., mixed) powder is then sintered to form a sintered body or "cake." Preferably, the sintering takes place in a furnace at a temperature of about 1500° C. for about 10 hours. However, other appropriate sintering temperatures and duration may be used.

The sintered body is then milled to form a second powder. Preferably, the second powder is milled until it has a median particle size of 4 microns or less with a narrow particle distribution. The second powder is preferably milled in propanol or water as the milling media or liquid and subsequently dried. However, other milling media, such as methanol, for example, may be used instead. Optionally, zirconium and/or strontium may be added to the first powder or to the second powder as zirconium oxide or strontium carbonate powders.

The second powder is then preferably mixed with a binder to form an emissive mixture suspension. Preferably, the binder comprises an organic material, such as nitrocellulose, in a solvent such as butyl acetate, amyl acetate, methyl propanol or propylene glycol mono-methyl ether acetate at a 90–95% level with 1–2% denatured ethanol. The binder enhances the adhesion of the powder particles to each other and to the lamp electrode. However, the binder may be omitted to simplify processing, if desired.

In an alternative aspect of the present invention, the milling media comprises the binder solution. Thus, the sintered body is immersed into the binder solution and milled into the second powder directly in the binder solution, thus combining the separate milling and mixing steps into a single step to decrease processing time and cost. However, emissive mixtures prepared by direct milling in the binder solution may result in an increased number of oxide bands on the lamp envelope or cover compared to emissive mixtures prepared by separately milling and mixing with the binder.

The emissive mixture suspension is then coated onto an electrode, such as a cathode of a fluorescent lamp, by a process such as dip coating or other coating processes. The electrode is then resistively heated to evaporate the binder from the emissive mixture suspension to obtain the emissive mixture formed on the electrode (i.e., the emissive mixture is "activated"). The activation may be carried out for 25–35 seconds at a temperature of 1050–1150° C. However, other temperatures and duration may be used that are sufficient to evaporate the binder from the emissive mixture.

In another alternative aspect of the present invention, the step of sintering in the furnace may be omitted, and instead the sintering and activation steps may be combined into a single step by resistively heating the emissive mixture suspension coated on the lamp electrode to decrease processing time and cost. However, emissive mixtures prepared by an in-situ activation and sintering on the electrode result in a greater amount of oxide bands on the lamp cover and a lower lamp efficacy than emissive mixtures prepared by sintering in a furnace. Furthermore, in order to further reduce process time and cost, the milling and binder mixing steps may be combined into a single step, as described above, in addition to combining the sintering and activation steps into a single step.

Figure 3:
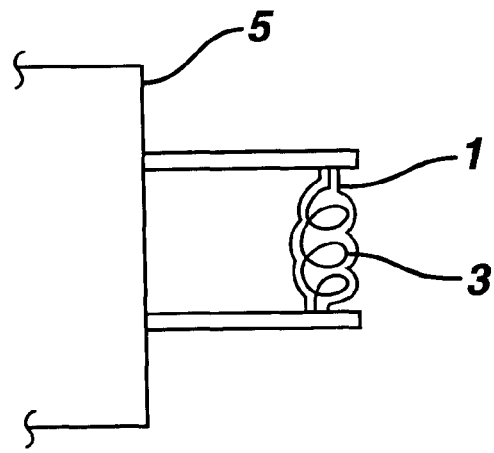
FIG. 3 is a side cross-sectional view of a coil cathode containing an emissive mixture according to a preferred embodiment of the present invention.
Figure 4:
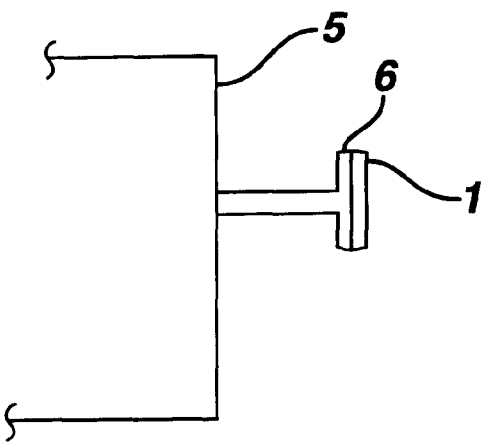
FIG. 4 is a side cross-sectional view of a flat member cathode containing an emissive mixture according to a preferred embodiment of the present invention.
Figure 5:
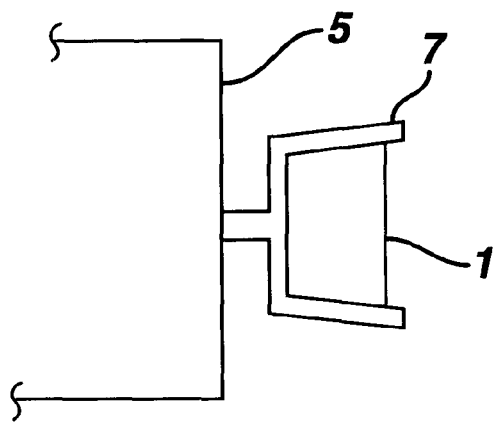
FIG. 5 is a side cross-sectional view of a cup shaped cathode containing an emissive mixture according to a preferred embodiment of the present invention.
Figure 6:
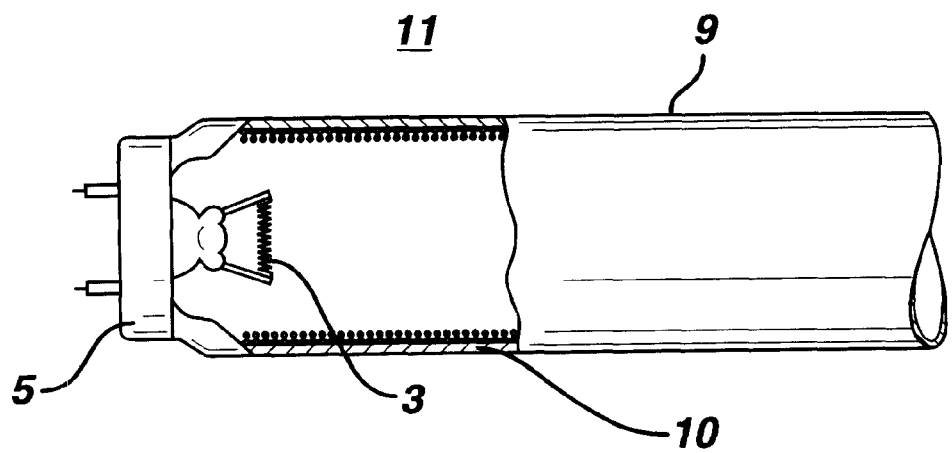
FIG. 6 is a side cross-sectional view of a linear fluorescent lamp containing an emissive mixture according to a preferred embodiment of the present invention.
Figure 7:
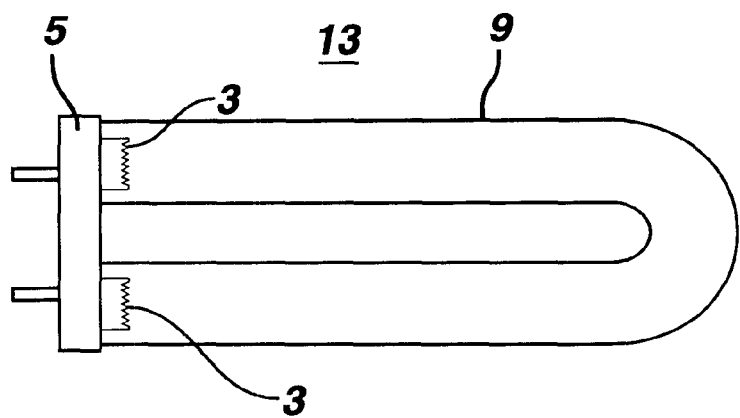
FIG. 7 is a side cross-sectional view of a compact fluorescent lamp containing an emissive mixture according to a preferred embodiment of the present invention.
Figure 8:
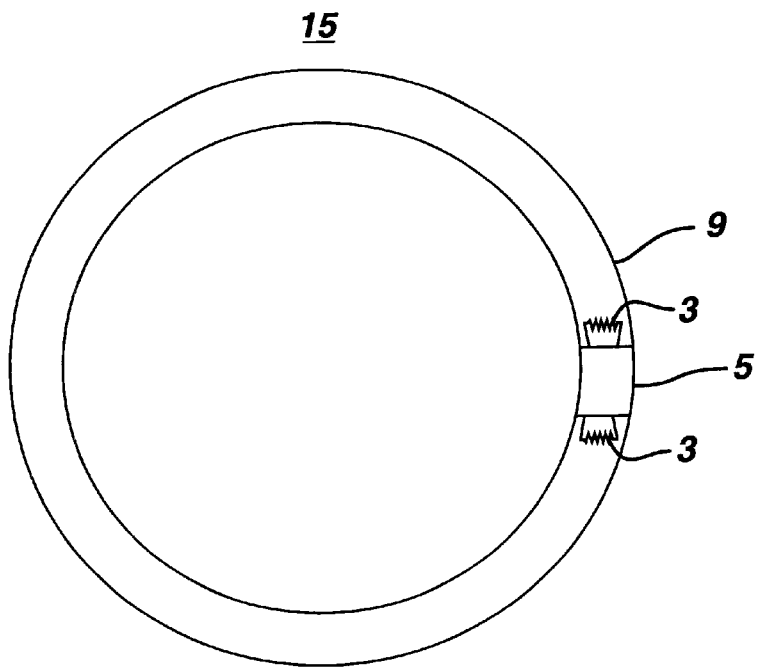
FIG. 8 is a top cross-sectional view of a circular fluorescent lamp containing an emissive mixture according to a preferred embodiment of the present invention.
Figure 9:
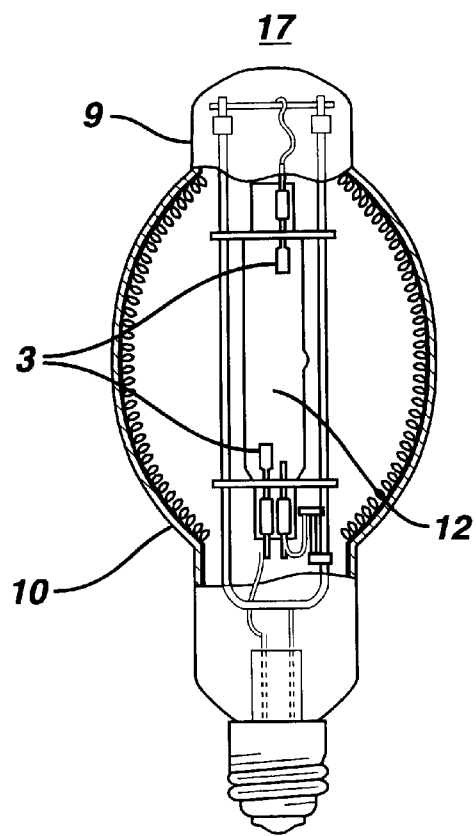
FIG. 9 is a side cross-sectional view of a high pressure fluorescent lamp containing an emissive mixture according to a preferred embodiment of the present invention.

In a preferred aspect of the present invention, the emissive mixture 1 is coated on a lamp cathode. The cathode may comprise a wire or a coil 3, such as a tungsten coil illustrated in FIG. 3, connected to a ballast 5. Alternatively, the cathode may comprise a flat member 6 containing the emissive mixture 1 on at least one surface, as illustrated in FIG. 4, or a cup 7 containing the emissive mixture 1 inside the hollow interior space, as illustrated in FIG. 5. The lamp may comprise any lamp, preferably a florescent lamp containing a cathode 3, a ballast 5 and a gas containing envelope or cover 9. The interior surface of the envelope may be coated with a luminescent material or phosphor 10, as is known in the art. The fluorescent lamp may comprise a linear fluorescent lamp 11 illustrated in FIG. 6, a compact fluorescent lamp 13, illustrated in FIG. 7 or a circular fluorescent lamp 15, illustrated in FIG. 8. Alternatively, the lamp may comprise a high pressure lamp 17 containing an inner gas envelope 12 inside the outer cover or bulb 9, as illustrated in FIG. 9.

SPECIFIC EXAMPLES

It should be understood that the examples below are meant to merely illustrate the present invention and should not be deemed as limiting the scope of the claims.

Figure 10:
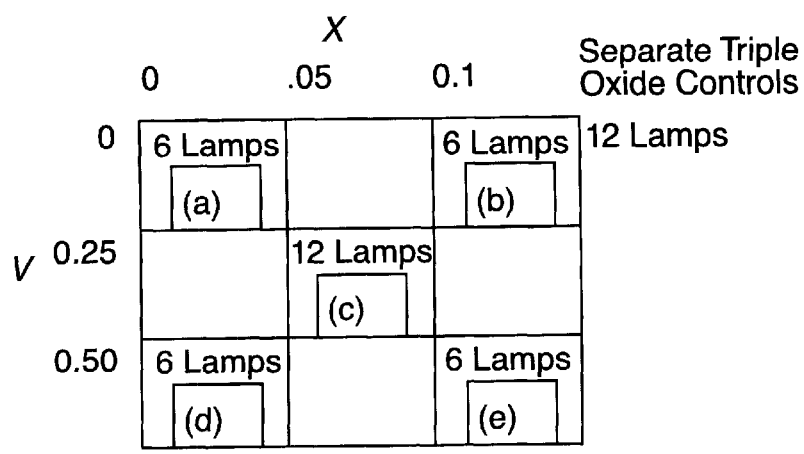
FIG. 10 is a schematic diagram of the experimental design of the specific examples of the present invention.

The present inventors have tested the efficacy and operational lifetime of 48 compact fluorescent lamps using a full 2×2 factorial test that included a center-point, as illustrated in FIG. 10. The test was designed to examine the effect of varying the levels of calcium and tungsten in the barium tantalate emission mixture. The lamp and ballast types used were Triple-Biax™ 15-Watt Hex lamps with ballasts operating in the Instant Start mode. All electrode structures were 6-ohm type. The present inventors compared the prior art triple oxide and $Ba_6Ta_2O_{11}$ (composition a) emissive mixtures to Ca and/or W containing barium tantalate mixtures (compositions b through e) made according to preferred aspects of the present invention, as illustrated in FIG. 10. Table 1 shows the breakdown of this experiment, including the duration of the on/off instant start cycle of the test and the levels of Ca and W being varied.

TABLE 1

| Emissive Mixture | Rapid Cycle (30 sec. on/ 4.5 min. off) | Standard Cycle (3 hour on/ 20 min. off) |
|---|---|---|
| Triple Oxide (BaSrCaO) | 6 lamps | 6 lamps |
| a) $Ba_6Ta_2O_{11}$ | 6 lamps | |
| b) $(Ba_{.90}Ca_{.10})_6Ta_2O_{11}$ | 6 lamps | |
| c) $(Ba_{.95}Ca_{.05})_6(Ta_{.75}W_{.25})_2O_{11.25}$ | 6 lamps | 6 lamps |
| d) $Ba_6TaWO_{11.5}$ | 6 lamps | |
| e) $(Ba_{.90}Ca_{.10})_6TaWO_{11.5}$ | 6 lamps | |

Table 2 demonstrates the initial wire-lamp and system (i.e., lamp plus ballast) performance results after 100 hours of lamp operation at 216 mA current and 30 kHz frequency. Wire lamp measurements were made at steady state as measured by a chart recorder output of the lumens signal (typically about 1 hour), with a temperature controlled heater to maintain an amalgam temperature of 90° C. System efficacy was measured with 120 V/60 Hz ballast modified to operate in Instant Start mode.

TABLE 2

| Emissive Mixture | Number of lamps | Lamp Efficacy (steady state LPW) | System Efficacy (LPW) | System Power (W) |
|---|---|---|---|---|
| Triple Oxide Emissive mixture weight = 3.53 ± 0.09 mg | 12 | 62.9 ± 0.7 | 60.0 ± 0.3 | 14.3 ± 0.1 |
| a) $Ba_6Ta_2O_{11}$ Emissive mixture weight = 5.34 ± 0.14 mg | 6 | 61.7 ± 1.4 | 59.1 ± 0.5 | 14.5 ± 0.1 |
| b) $(Ba_{.90}Ca_{.10})_6Ta_2O_{11}$ emissive mixture weight = 5.33 ± 0.20 mg | 6 | 62.3 ± 1.0 | 58.8 ± 1.2 | 14.5 ± 0.2 |
| c) $(Ba_{.95}Ca_{.05})_6(Ta_{.75}W_{.25})_2O_{11.25}$ emissive mixture weight = 5.24 ± 0.15 mg | 12 | 60.8 ± 1.1 | 58.0 ± 0.7 | 14.5 ± 0.1 |
| d) $Ba_6TaWO_{11.5}$ emissive mixture weight = 5.33 ± 0.16 mg | 6 | 56.4 ± 2.7 | 54.9 ± 1.3 | 14.6 ± 0.2 |
| e) $(Ba_{.90}Ca_{.10})_6TaWO_{11.5}$ emissive mixture weight = 5.27 ± 0.20 | 6 | 60.5 ± 1.0 | 57.9 ± 0.6 | 14.5 ± 0.1 |

As may be seen from Table 2, the efficacy of the emissive mixtures b)-e), especially mixture b), $(Ba_{.90}Ca_{.10})_6Ta_2O_{11}$, are comparable to the efficacy of the triple oxide mixture and mixture a). Nominally, the presence of the tungsten appears to be a negative contributing factor, while that of calcium appears to be a positive contributing factor to the overall lamp efficacy.

Figure 11:
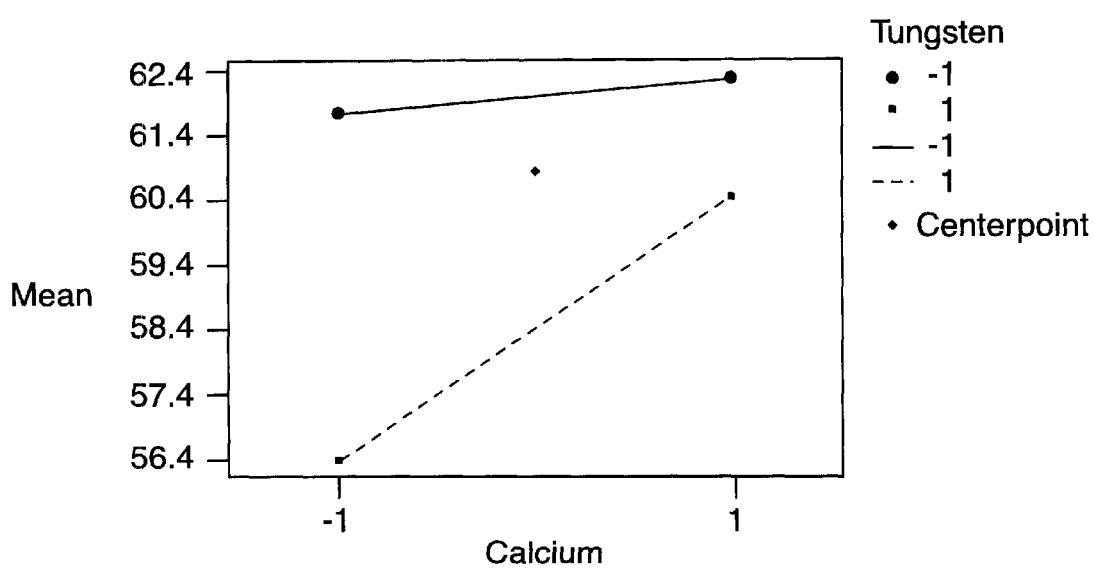
FIG. 11 is an interaction plot of wire lamp efficacies for various emissive mixtures according to the specific examples of the present invention.

FIG. 11 illustrates an interaction plot of the wire lamp efficacies. In this plot, the low and high tungsten and calcium levels are coded as −1 and +1, respectively. (For example, a −1 tungsten level and a +1 calcium level would mean y=0 and x=0.1 and the following composition: $(Ba_{.90}Ca_{.10})_6Ta_2O_{11}$ from Tables 1 and 2) From the fact that the two lines shown in FIG. 11 (for the low and high tungsten levels) are not parallel, it can be concluded that there is a positive interaction between the tungsten and the calcium. Furthermore, by extrapolating the low calcium and tungsten levels shown in Table 2 and FIG. 11 to higher calcium and tungsten levels, it becomes apparent that there is an interaction between the tungsten and the calcium. Adding calcium makes a much larger improvement to the efficacy when some tungsten is present, compared to a lamp with an emissive mixture containing no tungsten.

A multiple regression analysis performed on the above data yields formula I described above, which is the transfer function for mean wire-lamp efficacy. Furthermore, the contour plot illustrated in FIG. 1 and also described above was extrapolated from the data provided in Table 2.

Table 3 illustrates the Rapid Cycle and Standard Cycle Instant Start operating lifetime test results, measured in the number of starts until failure. The values following the +/− sign in Table 3 are the number of standard deviations away from 10,000 starts. Table 3 also provides a subjective gauge of the level or extent of dark or "greenish" oxide bands, described above. A subjective gauge of the extent of these oxide bands was made by examining the lamps after their initial 100 hour seasoning period, before they had gone on to the life tests. A scale of 0–5 was used where 0 meant no band and 5 meant a very heavy (~3–4 mm wide) band.

TABLE 3

| Emissive Mixture | # of Starts on Rapid Cycle Instant Start mode (30 sec. on/4.5 min. off) | # Hours on Standard Cycle Instant Start Mode (3 hours on/20 min. off) | Level of "green" oxide bands at 100 hrs |
|---|---|---|---|
| Triple Oxide | 5694 ± 831 | >8350 (6 of 6 still running) | 0 |
| a) $Ba_6Ta_2O_{11}$ | 12331 ± 2804 | NA | 0 |
| b) $(Ba_{.90}Ca_{.10})_6Ta_2O_{11}$ | 11849 ± 1466 | NA | 0 |
| c) $(Ba_{.95}Ca_{.05})_6(Ta_{.75}W_{.25})_2O_{11.25}$ | 18650 ± 7083 | >8350 (6 of 6 still running) | 0.33 ± 0.75 |
| d) $Ba_6TaWO_{11.5}$ | 25612 ± 5966 | NA | 3.58 ± 1.56 |
| e) $(Ba_{.90}Ca_{.10})_6TaWO_{11.5}$ | 16932 ± 5043 | NA | 0 |

As may be seen from Table 3, the addition of tungsten to compositions c), d) and e) significantly increases the number of starts compared to the triple oxide and the prior art composition a) which contains no tungsten. The addition of tungsten also increases the level of oxide bands. However, the addition of calcium, particularly the 0.1 atomic ratio of calcium in composition e), eliminated the oxide bands despite the presence of tungsten, while still maintaining a greater number of starts than the prior art composition a) which contains no tungsten.

Figure 12:
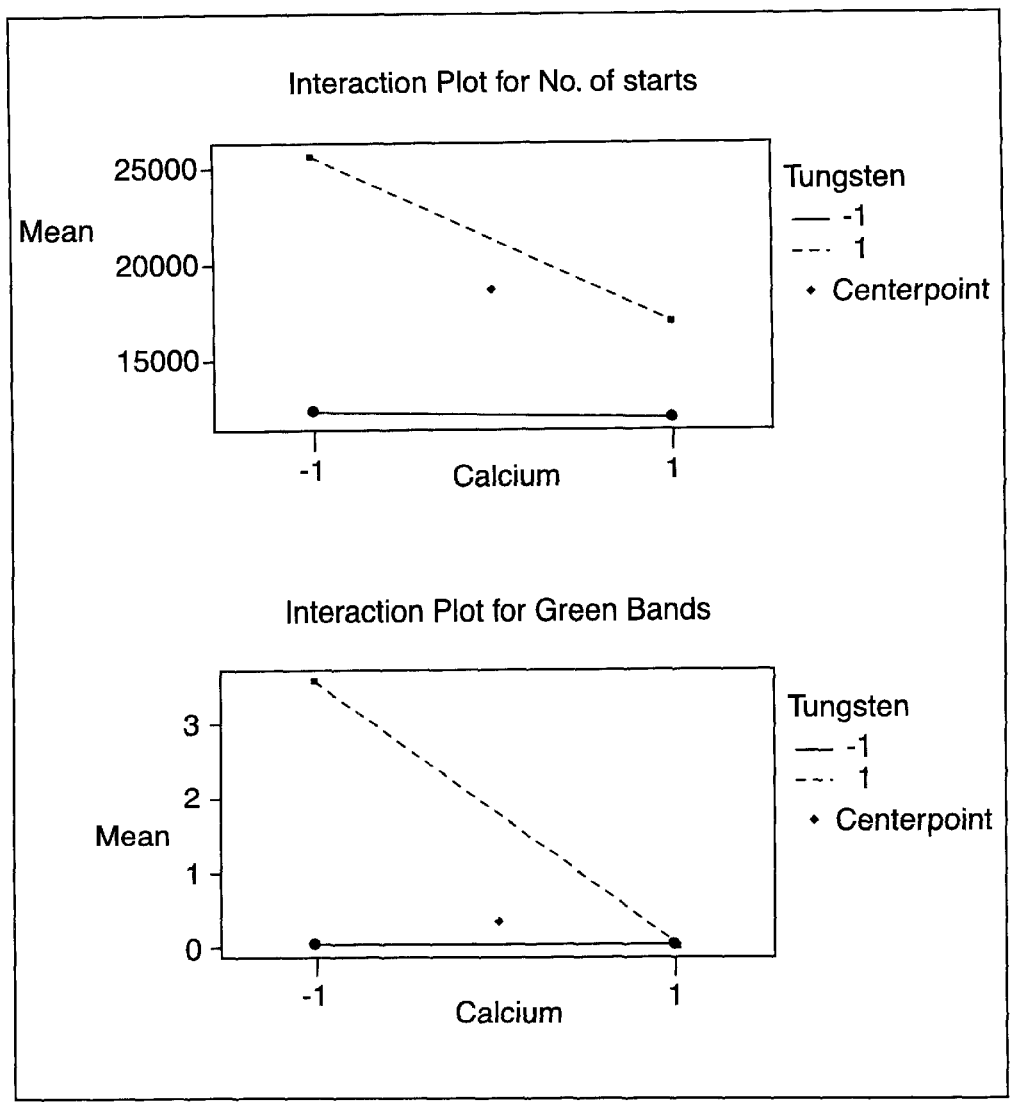
FIG. 12 is an interaction plot of wire lamp number of starts for various emissive mixtures according to the specific examples of the present invention.

FIG. 12 illustrates an interaction plot of the mean number of starts of a lamp based on the amount of calcium and tungsten in the emissive mixture. From the fact that the two lines shown in FIG. 12 (for the low and high tungsten levels) are not parallel, it can be concluded that there is a positive interaction between the tungsten and the calcium. Furthermore, by extrapolating the low calcium and tungsten levels shown in Table 3 and FIG. 12 to higher calcium and tungsten levels, it becomes apparent that there is an interaction between the tungsten and the calcium. Decreasing the amount of calcium makes a much larger improvement in the operating lifetime of a lamp whose emissive mixture contains some tungsten, compared to a lamp whose emissive mixture contains no tungsten.

A multiple regression analysis performed on the above data yields formula II described above, which is the transfer function for mean number of starts until failure. Furthermore, the contour plot illustrated in FIG. 2 and also described above was extrapolated from the data provided in Table 3.

The specific examples described above demonstrate the unexpected improvement in lamp efficacy and operating lifetime by adding calcium and/or tungsten to a barium tantalate emissive mixture. The specific examples described above also form the basis of the contour plots illustrated in FIGS. 1 and 2, which demonstrate the unexpected, synergistic result of adding both calcium and tungsten to the emissive mixture.

While the invention has been described in detail and with reference to specific embodiments thereof, it will be apparent to one skilled in the art that various changes and modifications can be made therein without departing from the spirit and scope of the invention.

What is claimed is:

1. A composition of matter, comprising:
   $(A_{1-x} Ca_x)_6 (Ta_{1-y} W_y)_2 O_{11+y}$
   wherein A comprises one of barium or a combination of barium and strontium;
   $0 \leq x \leq 0.5$;
   $0 \leq y < 1$; and
   at least one of x or y is greater than zero.
2. The composition of claim 1, wherein $0 < x < 0.3$.
3. The composition of claim 2, wherein $0.05 \leq x \leq 0.1$.
4. The composition of claim 1, wherein $0 < y < 0.75$.
5. The composition of claim 4, wherein $0.25 \leq y \leq 0.5$.
6. The composition of claim 1, wherein $0.25 \leq x \leq 0.3$ and $0.5 \leq y \leq 0.75$.
7. The composition of claim 1, wherein $0 \leq x \leq 0.05$ and $0.5 \leq y \leq 0.75$.
8. The composition of claim 1, wherein $0.05 \leq x \leq 0.1$ and $0 \leq y \leq 0.5$.
9. The composition of claim 1, wherein both x and y are greater than zero.
10. The composition of claim 1, comprising $(Ba_{0.90} Ca_{0.10})_6 Ta_2 O_{11}$.
11. The composition of claim 1, comprising $(Ba_{0.95} Ca_{0.05})_6 (Ta_{0.75} W_{0.25})_2 O_{11.25}$.
12. The composition of claim 1, comprising $Ba_6 Ta W O_{11.5}$.
13. The composition of claim 1, comprising $(Ba_{0.90} Ca_{0.10})_6 Ta W O_{11.5}$.
14. The composition of claim 1, further comprising 2–3 weight percent of zirconium.
15. An electrode, comprising:
    an electrode base; and
    an emissive mixture comprising the composition of matter according to claim 1 in contact with the base.
16. The electrode of claim 15, wherein the base comprises a wire or a coil coated with the emissive mixture.
17. The electrode of claim 15, wherein the base comprises a flat member or a cup containing the emissive mixture.
18. The electrode of claim 15, wherein the electrode is a cathode.
19. A fluorescent lamp comprising the cathode of claim 18, an envelope and a gas within the envelope.
20. The fluorescent lamp of claim 19, wherein the lamp is a linear fluorescent lamp, compact fluorescent lamp, a circular fluorescent lamp or a high pressure lamp.
21. A method of malking an emissive mixture comprising a composition of matter having a formula $(A_{1-x} Ca_x)_6 (Ta_{1-y} W_y)_2 O_{11+y}$, the method comprising:
    determining a desired ratio of a mean lamp efficacy to a mean number of lamp starts by determining the amount of Ca and W to be present in the emissive mixture;
    mixing predetermined amounts of starting materials based on the determination the desired ratio to form the emissive mixture;
    wherein A comprises one of barium or a combination of barium and strontium;
    $0 \leq x \leq 0.5$;
    $0 \leq y \leq 1$; and
    at least one of x or y is greater than zero.
22. The method of claim 21, wherein:
    the mean lamp efficacy is determined from formula (I):

$$\text{efficacy} = 60.4 - 1.79*(y) + 0.15*(x) + 0.89*(y)*(x) \qquad (I);$$

and
    the mean number of lamp starts is determined from formula (II):

$$\text{number of starts} = 17{,}074 + 4591*(y) - 2290*(x) - 2049*(y)*(x) \qquad (II);$$

wherein y comprises the atomic ratio of tungsten and x comprises the atomic ratio of calcium in the emissive mixture.
23. The method of claim 21, wherein the step of mixing predetermined amounts of starting materials comprises:
    mixing a $BaCO_3$ powder, a $Ta_2O_5$ powder and at least one of a $CaCO_3$ powder and a $WO_3$ powder to form a first powder;
    sintering the first powder to form a sintered body;
    milling the sintered body to form a second powder; and
    mixing the second powder with a binder to form an emissive mixture suspension;
    and
    further comprising a step of coating the emissive mixture suspension on an electrode.
24. The method of claim 23, wherein the step of sintering comprises sintering the first powder in a furnace and further comprising a step of resistively heating the electrode to evaporate the binder from the emissive mixture suspension after the step of coating the emissive mixture suspension.
25. The method of claim 23, wherein the binder comprises a binder solution of nitrocellulose in a solvent.
26. The method of claim 25, wherein the steps of milling the sintered body and mixing the second powder with a binder comprise the steps of:
    immersing the sintered body into the binder solution; and
    milling the sintered body in the binder solution to form the emissive mixture suspension comprising the second powder dispersed in the binder solution.
27. The method of claim 23, wherein the step of milling comprises milling the sintered body in propanol or water to form the second powder followed by a step of drying the second powder.

28. The method of claim 23, further comprising a step of milling the $Ta_2O_5$ powder such that the average particle size of the a $Ta_2O_5$ powder is reduced to 4 µm or less prior to the step of mixing to form the first powder.

29. The method claim 21, wherein the step of mixing predetermined amounts of starting materials comprises:

mixing a $BaCO_3$ powder, a $Ta_2O_5$ powder and at least one of a $CaCO_3$ powder and a $WO_3$ powder to form a first powder;

mixing the first powder with a binder solution to form an emissive mixture suspension; and further comprising the step of coating the emissive mixture suspension on an electrode followed by a step of resistively heating the electrode to sinter the first powder and to evaporate the binder from the emissive mixture suspension.

30. The method of claim 21, wherein the step of determining the desired ratio of the mean lamp efficacy to the mean number of lamp starts is performed once followed by plural steps of mixing predetermined amounts of starting materials.

* * * * *